(12) United States Patent
Higgins et al.

(10) Patent No.: US 12,055,248 B2
(45) Date of Patent: Aug. 6, 2024

(54) SECURING DEVICE

(71) Applicant: GALL THOMSON ENVIRONMENTAL LIMITED, Tewkesbury (GB)

(72) Inventors: Steven Higgins, Norwich (GB); Nathan Abel, Hemsby (GB)

(73) Assignee: Gall Thomson Environmental Limited, Tewkesbury (GB)

( * ) Notice: Subject to any disclaimer, the term of this patent is extended or adjusted under 35 U.S.C. 154(b) by 0 days.

(21) Appl. No.: 17/767,396

(22) PCT Filed: Oct. 8, 2020

(86) PCT No.: PCT/GB2020/052490
§ 371 (c)(1),
(2) Date: Apr. 7, 2022

(87) PCT Pub. No.: WO2021/069896
PCT Pub. Date: Apr. 15, 2021

(65) Prior Publication Data
US 2024/0077158 A1 Mar. 7, 2024

(30) Foreign Application Priority Data
Oct. 11, 2019 (GB) ..................... 1914708

(51) Int. Cl.
*F16L 37/00* (2006.01)
*F16L 37/10* (2006.01)
(Continued)

(52) U.S. Cl.
CPC .......... *F16L 37/002* (2013.01); *F16L 37/101* (2013.01); *F16L 37/30* (2013.01); *F16L 37/62* (2013.01)

(58) Field of Classification Search
CPC ....... F16L 37/002; F16L 37/101; F16L 37/30; F16L 37/367; F16L 37/373; F16L 29/04; F16L 55/1007; F16L 37/62; F16L 23/08
See application file for complete search history.

(56) References Cited

U.S. PATENT DOCUMENTS 3,204,515 A * 9/1965 Dickie .................. F16B 31/005
411/434
3,484,912 A * 12/1969 Crain ....................... F16L 23/10
24/279

(Continued)

FOREIGN PATENT DOCUMENTS

EP 0006278 1/1980
EP 2000730 12/2008
(Continued)

OTHER PUBLICATIONS

Patent Cooperation Treaty, International Search Report and Written Opinion of the International Searching Authority, received in International Application No. PCT/GB2020/052490, Feb. 1, 2021, 12 pp.

*Primary Examiner* — David Colon-Morales
(74) *Attorney, Agent, or Firm* — Fitch, Even, Tabin & Flannery LLP

(57) ABSTRACT

A securing device comprises a collar for releasably clamping first and second objects together, wherein the collar includes a pair of collar members, each of the collar members being pivotably coupled to the other collar member at or towards a first end so as to allow pivotable movement of the collar members relative to each other, the collar including a releasable securing member that includes securing member portions respectively arranged in or on the collar members at or towards their other second ends, wherein the securing member portions are configured to be coaxially connectable to each other to secure the collar members to each other at or towards their other second ends, and the securing member (Continued)

portions are configured to be coaxially disconnectable from each other to permit separation of the second ends of the collar members.

19 Claims, 13 Drawing Sheets

(51) Int. Cl.
*F16L 37/30* (2006.01)
*F16L 37/62* (2006.01)

(56) References Cited

U.S. PATENT DOCUMENTS

| | | | | |
|---|---|---|---|---|
| 3,926,090 | A * | 12/1975 | Bunker | F16B 37/0864 411/434 |
| 4,036,258 | A * | 7/1977 | Wolters | F16L 23/10 285/364 |
| 4,183,189 | A * | 1/1980 | Keller | E02B 17/0004 285/912 |
| 4,309,049 | A * | 1/1982 | Chevallier | F16L 55/1015 285/365 |
| 4,519,411 | A * | 5/1985 | Takahashi | F16L 55/1007 137/219 |
| 4,622,997 | A * | 11/1986 | Paddington | F16L 37/62 137/595 |
| 5,108,133 | A * | 4/1992 | Maloberti | F16B 37/0864 285/34 |
| 5,226,769 | A * | 7/1993 | Negre | F16B 21/073 411/383 |
| 5,507,313 | A * | 4/1996 | LeDevehat | F16L 37/62 137/614.05 |
| 5,645,303 | A | 7/1997 | Warehime | |
| 6,354,636 | B2 * | 3/2002 | Matsuzawa | F16L 23/08 285/365 |
| 8,127,785 | B2 * | 3/2012 | Webber | F16L 55/1007 137/614.04 |
| 8,465,060 | B2 * | 6/2013 | Peet | F16L 23/08 285/410 |
| 8,800,663 | B2 * | 8/2014 | Long | F16L 3/1075 285/410 |
| 10,550,659 | B2 * | 2/2020 | Kibler | F16L 37/002 |
| 10,801,621 | B2 * | 10/2020 | Eide | B25B 13/48 |
| 10,858,901 | B1 * | 12/2020 | Rahim | F16L 37/142 |
| 11,320,081 | B1 * | 5/2022 | Foley | F16L 55/1018 |
| 2012/0112451 | A1 * | 5/2012 | Long | F16L 37/62 285/18 |
| 2019/0383435 | A1 * | 12/2019 | Lilliesköld | B67D 9/00 |

FOREIGN PATENT DOCUMENTS

| | | | | |
|---|---|---|---|---|
| EP | 2374711 | A1 * | 10/2011 | B63B 27/24 |
| GB | 2051993 | | 1/1981 | |
| GB | 2391051 | | 1/2004 | |
| GB | 2391051 | A * | 1/2004 | F16L 55/1015 |
| GB | 2554692 | A * | 4/2018 | F61L 29/00 |
| GB | 2560751 | A * | 9/2018 | B63B 27/34 |
| GB | 2580038 | A * | 7/2020 | F16L 29/04 |
| TW | 201908638 | A | 3/2019 | |
| WO | WO-8402171 | A1 * | 6/1984 | |
| WO | WO-9711301 | A1 * | 3/1997 | F16L 23/04 |
| WO | WO-2006084447 | A1 * | 8/2006 | F16L 37/367 |
| WO | WO-2014031008 | A1 * | 2/2014 | F16L 1/26 |
| WO | 2018222605 | A1 | 12/2018 | |

* cited by examiner

SECURING DEVICE

CROSS-REFERENCE TO RELATED APPLICATIONS

This application is a U.S. national phase application filed under 35 U.S.C. § 371 of International Application No. PCT/GB2020/052490, filed Oct. 8, 2020, designating the United States, which claims priority from United Kingdom patent application No. GB1914708.1, filed Oct. 11, 2019, which are hereby incorporated by reference herein in their entirety.

FIELD

This invention relates to a securing device, preferably for use in a fluid conduit assembly.

BACKGROUND

It is known to use a collar to clamp two objects together.

SUMMARY

According to an aspect of the invention, there is provided a securing device comprising a collar for releasably clamping first and second objects together, wherein the collar includes a pair of collar members, each of the collar members being pivotably coupled to the other collar member at or towards a first end so as to allow pivotable movement of the collar members relative to each other, the collar including a releasable securing member that includes securing member portions respectively arranged in or on the collar members at or towards their other second ends, wherein the securing member portions are configured to be coaxially connectable to each other to secure the collar members to each other at or towards their other second ends, and the securing member portions are configured to be coaxially disconnectable from each other to permit separation of the second ends of the collar members.

The securing device of the invention may be used to releasably clamp a wide variety of objects together. Such objects may include, but are not limited to, a fluid conduit (such as a pipeline, manifold or hose), a fluid conduit section thereof, a cable and a rope. The fluid conduit or the fluid conduit section thereof may be flexible or rigid, and may have a fixed or variable position.

The configuration of the collar members and securing member in the securing device of the invention enables the coaxial connection and disconnection of the securing member portions to take place in the same plane as the pivotable movement of the collar members relative to each other. This not only allows for a more compact structural configuration of the collar members and securing member but also reduces the space required to accommodate the closing and opening of the collar, thus permitting the use of the securing device in narrower spaces. Furthermore, since the coaxial connection and disconnection of the securing member portions take place in the same plane as the pivotable movement of the collar members relative to each other, the second ends of the collar members can be secured to each other or separated in a smooth motion with minimal displacement and movement. The configuration of the collar therefore results in a securing device with the ability to carry out quick clamping and separation of the objects.

In contrast, a conventional collar comprises a latching pin that is pivotably mounted to one of a pair of collar members. In the conventional collar, the latching pin in a locking position is arranged to engage the other collar member in order to secure the collar members together, and is configured to pivot away from the other collar member to a release position in order to permit separation of the collar members. As a result of the pivot configuration of the latching pin, the conventional collar can only be used in spaces that are sufficiently sized to accommodate the pivoting movement of the latching pin between the locking and release positions. Thus, the conventional collar is susceptible to the separation of the objects being prevented by the conventional collar failing to open due to the latching pin being obstructed while pivoting to its release position, which is not conducive to quick separation of the objects.

It will be understood that the collar of the invention may include one or more additional collar members other than the pair of collar members already mentioned, so long as the pair of collar members is pivotably coupled to the other collar member at or towards a first end so as to allow pivotable movement of the collar members relative to each other. It will also be understood that the pair of collar members may be directly connected to each other so as to be pivotably coupled to each other at or towards their first ends, and that the pair of collar members may be indirectly connected to each other via one or more intermediate collar members or components so as to be pivotably coupled to each other at or towards their first ends.

In a preferred embodiment of the invention, the securing member may be configured as a two-piece securing member that consists of a pair of securing member portions. Configuring the securing member as such simplifies the design of the coaxial connection and disconnection of the securing member portions. It will however be appreciated that the securing member may alternatively include three or more securing member portions.

The configuration of the coaxial connection between the securing member portions may be carried out in various ways as long as coaxial disconnection of the securing member portions is also permitted. For example, in embodiments of the invention, the securing member portions may be configured to be coaxially and threadedly connectable to each other to secure the collar members to each other at or towards their other second ends.

Optionally a first securing member portion may include one or more radially movable elements. The first securing member portion may be configured to be axially connectable to a second securing member portion through radial movement of the one or more radially movable elements to positively engage the second securing member portion so as to releasably lock the first and second securing member portions together. For example, the first securing member portion may include one or more radially expandable elements, the second securing member portion may include a hollow bore into which the or each radially expandable element is insertable, and the first and second securing member portions may be configured to be coaxially connectable to each other through radial expansion of the one or more radially expandable elements to positively engage an inner wall of the hollow bore of the second securing member portion so as to releasably lock the first and second securing member portions together.

The configuration of the securing member to releasably lock the first and second securing member portions together through positive engagement between the one or more radially movable elements and the second securing member portion is compatible with the coaxial connection and disconnection of the securing member portions.

The positive engagement between the one or more radially movable elements and the second securing member portion may be carried out using engagement elements that are respectively formed on the one or more radially movable elements and the second securing member portion. For example, the engagement elements may be in the form of mating screw threads, or in the form of male and female abutment surfaces (such as a projection and a receptacle) respectively.

In embodiments of the invention employing the one or more radially movable elements, the first securing member portion may include an abutment member that is movable to selectively engage the one or more radially movable elements to force its radial movement and disengage from the one or more radially movable elements to permit the one or more radially movable elements to return to its original position.

In such embodiments, the abutment member may be tapered. The tapered shape of the abutment member provides a reliable means for enabling the abutment member to move to engage the one or more radially movable elements to force its radial movement and disengage from the one or more radially movable elements to permit the one or more radially movable elements to return to its original position.

In embodiments of the invention employing the abutment member, a or the second securing member portion may include a biasing element (such as a resilient element, e.g. a spring) that is configured to apply a biasing force to push the abutment member in a direction towards the first securing member portion and away from the second securing member portion.

The provision of the biasing element in the second securing member portion not only provides a retention force to maintain the engagement between the abutment member and the one or more radially movable elements when the securing member portions are connected to each other but also provides a thrusting force to aid the separation of the securing member portions when they are disconnected from each other.

In further embodiments of the invention, the securing device may include a plurality of attachment assemblies. Each attachment assembly may be configured to attach a respective one of the securing member portions to the respective collar member. The structure of the attachment assembly may vary so long as the securing member portions are configured to be coaxially connectable to each other to secure the collar members to each other at or towards their other second ends and to be coaxially disconnectable from each other to permit separation of the second ends of the collar members.

One non-limiting example of such an attachment assembly is a trunnion assembly. The use of trunnion assemblies as the attachment assemblies provides a reliable means of attaching the securing member portions to the respective collar members in a manner that is compatible with the coaxial connection and disconnection of the securing member portions taking place in the same plane as the pivotal movement of the collar members relative to each other. The use of trunnion assemblies as the attachment assemblies also enables the securing member portions to be housed within the respective collar members, thus permitting a more compact structural configuration of the collar that provides protection for the securing member portions.

In still further embodiments of the invention, the securing device may include a support structure, and each attachment assembly may be arranged to be slidably movable within a respective guide slot of the support structure. The guide slots may be arranged in the support structure so that the attachment assemblies may be slidable in the respective guide slots towards each other to connect the securing member portions to each other and so that the attachment assemblies may be slidable in the respective guide slots away from each other when the securing member portions are disconnected from each other. Preferably each guide slot may be oriented at a non-zero angle, i.e. inclined, with respect to a horizontal line passing through the support structure.

The provision of the guide slots in the support structure not only guides the pivotal movement of the collar members to separate the second ends of the collar members following disconnection of the securing member portions but also holds the open collar to prevent it from being damaged due to a fall.

In embodiments of the invention, the securing device may include an actuation mechanism operably coupled to the securing member. The actuation mechanism may include a driving assembly configured to, in use, drive the securing member to coaxially disconnect the securing member portions from each other. Preferably the driving assembly is configured to, in use, mechanically drive the securing member to coaxially disconnect the securing member portions from each other The provision of an actuation mechanism for driving the coaxial disconnection of the securing member portions allows selective operation of the securing device to open the collar in order to separate the first and second objects and thereby provides active control over the timing of the opening of the collar. This may be used to, for example, configure the securing device as a quick disconnect device for carrying out quick disconnection of first and second fluid conduit sections on demand.

The actuation mechanism may be configured to permit remote operation of the securing device from a remote location, such as a ship or shore-based control room. This is particularly beneficial in circumstances where it is difficult or inconvenient for a user to access the securing device, e.g. due to its distant location or due to the presence of one or more hazards in the vicinity of the securing device, or where it is not safe for a user to be in the vicinity of the securing device during and after the opening of the collar, e.g. due to the motion of the securing device and/or the motion of either or both of the objects during and after the opening of the collar.

The actuation mechanism may be operated under a range of circumstances, examples of which are set out as follows.

In a first example, the actuation mechanism may be operated when personnel or sensors determine that it is no longer safe or desirable to continue clamping the objects together.

In a second example, the actuation mechanism may be operated when sensors detect an abnormal condition of, or associated with, the objects. Such an abnormal condition may be a load applied to the objects that exceeds a predetermined limit or rating.

In a third example, the actuation mechanism may be operated when it is desirable to perform maintenance, repair or servicing of the objects.

There are different ways of driving the securing member to perform the coaxial disconnection of the securing member portions.

In a first exemplary way, the driving assembly may include a hydraulic actuator configured to, in use, hydraulically drive the securing member to coaxially disconnect the securing member portions from each other.

In a second exemplary way, the driving assembly may include a pneumatic actuator configured to, in use, pneumatically drive the securing member to coaxially disconnect the securing member portions from each other.

In embodiments of the invention employing the one or more radially movable elements and a hydraulic or pneumatic actuator, the first securing member portion may include a piston and a chamber. The piston may be operably coupled to the abutment member. The piston may be housed within the chamber so that a change in hydraulic or pneumatic pressure inside the chamber enables displacement of the piston to move the abutment member to selectively engage the one or more radially movable elements and disengage from the one or more radially movable elements.

In further embodiments of the invention, the securing member may be configured to permit coaxial reconnection of the securing member portions following disconnection of the securing member portions. This enables the securing member to be reset to its coaxially connected configuration, thus allowing the securing member to be reused following the disconnection.

In still further embodiments of the invention, the collar may include a joint assembly that interconnects the collar members at or towards their first ends. The joint assembly may be configured to apply a pulling force to the first ends of the collar members.

The application of a pulling force to the first ends of the collar members aids the pivotable movement of the collar members relative to each other to enhance the separation of the second ends of the collar members. This improves the opening of the collar by reducing the risk of insufficient separation of the second ends of the collar members, which may prevent the successful separation of the first and second objects.

In such embodiments, the joint assembly may include a joint member that is configured to be under tension when the collar members are secured to each other at or towards their other second ends. While the second ends of the collar members are secured to each other via the securing member, the joint member is pre-tensioned so as to enable the immediate application of a pulling force to the first ends of the collar members on disconnection of the securing member portions. This improves the reliability and speed of opening the collar and thereby improves the reliability and speed of separating the objects, which is particularly beneficial in quick disconnect applications.

The joint member of the invention may take any shape but is preferably an elongate member. The securing member of the invention may take any shape but is preferably an elongate member. The elongate member may be a bolt, stud, pin or bar.

According to a further aspect of the invention, there is provided a fluid conduit assembly comprising first and second fluid conduit sections and the securing device according to any one of the embodiments of the first aspect of the invention described hereinabove, wherein the collar is configured to clamp the first and second fluid conduit sections together when the collar members are secured to each other at or towards their other second ends, and wherein the collar is configured to permit separation of the first and second fluid conduit sections from each other when the second ends of the collar members are separated from each other.

In use, the fluid conduit assembly transports a fluid from one location to another location. Such fluids include liquids and gases, particularly liquid natural gas, petrochemicals and hydrocarbons.

The provision of the collar in the fluid conduit assembly enables the first and second fluid conduit sections to be securely clamped together during the transportation of fluid through the fluid conduit assembly, and enables the fluid conduit sections to be readily disconnected from each other through the coaxial disconnection of the securing member portions and the subsequent pivotal movement of the collar members relative to each other. The disconnection of the fluid conduit sections may take place under normal operating conditions (such as completion of a fluid transfer process) or under emergency operating conditions (such as the fluid conduit sections being exposed to unexpected loads beyond its allowable load rating).

The features and advantages of the securing device of the first aspect of the invention and its embodiments apply mutatis mutandis to the fluid conduit assembly of the second aspect of the invention and its embodiments.

In embodiments of the invention, the collar may be configured to clamp respective flanges of the first and second fluid conduit sections together when the collar members are secured to each other at or towards their other second ends. The provision of the pivotable collar members not only enables the securing device to securely clamp the flanges of the first and second fluid conduit sections together but also permits the opening of the collar to release the flanges in order to achieve quick disconnection of the first and second fluid conduit sections.

In further embodiments of the invention, the fluid conduit assembly may include at least one shut-off valve located within a hollow bore of at least one of the fluid conduit sections, the or each shut-off valve including a valve member movable between a valve open position and a valve closed position in which the valve member shuts off the flow of a flowable material through the hollow bore, the or each valve member configured to move to its valve closed position on separation of the fluid conduit sections. Furthermore, the fluid conduit assembly may include: a first shut-off valve located within a hollow bore of the first fluid conduit section; and a second shut-off valve located within a hollow bore of the second fluid conduit section.

The provision of the or each shut-off valve to close off the hollow bore on separation of the fluid conduit sections ensures little to no fluid spillage when the securing device is used to carry out quick disconnection of the fluid conduit sections.

The or each valve member may be biased to move to its valve closed position on separation of the fluid conduit sections. Alternatively the or each valve member may be controllable, e.g. using an actuator, to move to its valve closed position on separation of the fluid conduit sections.

The invention is applicable to a wide range of shut-off valves, the structure and configuration of which may vary to optimise the design of the fluid conduit assembly in terms of, for example, effective length, size, weight and costs. Non-limiting examples of such shut-off valves are described elsewhere in this specification.

The securing device of the invention is applicable to a wide range of fluid conduit assemblies that require the connection and disconnection of separate fluid conduit sections. In addition, the invention is applicable to a wide range of fluid conduit sections, the structure and configuration of which may vary. Non-limiting examples of such fluid conduit sections are described as follows and elsewhere in this specification.

One of the first and second fluid conduit sections may be the upstream fluid conduit section, and the other of the first and second fluid conduit sections may be the downstream fluid conduit section.

The first and second fluid conduit sections may be directly secured to each other. Alternatively, the fluid conduit sections may be indirectly secured to each other. For example, the first and second fluid conduit sections may be secured to each other via one or more additional fluid conduit sections placed between the first and second fluid conduit sections.

Each of the first and second fluid conduit sections may form part of, or may be connectable to, a flexible fluid conduit such as a hose. Alternatively, each of the first and second fluid conduit sections may form part of, or may be connectable to, a rigid fluid conduit such as a pipeline or manifold (e.g. a tanker manifold). Further alternatively, one of the first and second fluid conduit sections may form part of, or may be connectable to, a flexible fluid conduit and the other of the first and second fluid conduit sections may form part of, or may be connectable to, a rigid fluid conduit.

In still further embodiments of the invention, the fluid conduit assembly may include a fluid capture device arranged beneath the first and second fluid conduit sections for collecting any fluid spillage from the first and second fluid conduit sections when they are separated.

The inclusion of the fluid capture device (such as a container) in the fluid conduit assembly ensures that any fluid spillage from the first and second fluid conduit sections is safely collected, even during an unplanned disconnection of the first and second fluid sections due to an emergency.

It will be appreciated that the use of the terms "first" and "second", and the like, in this patent specification may be used to help distinguish between similar features (e.g. the first and second objects, the first and second fluid conduit sections, the first and second fluid conduits), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

A preferred embodiment of the invention will now be described, by way of a non-limiting example, with reference to the accompanying drawings in which.

Figure 1A:
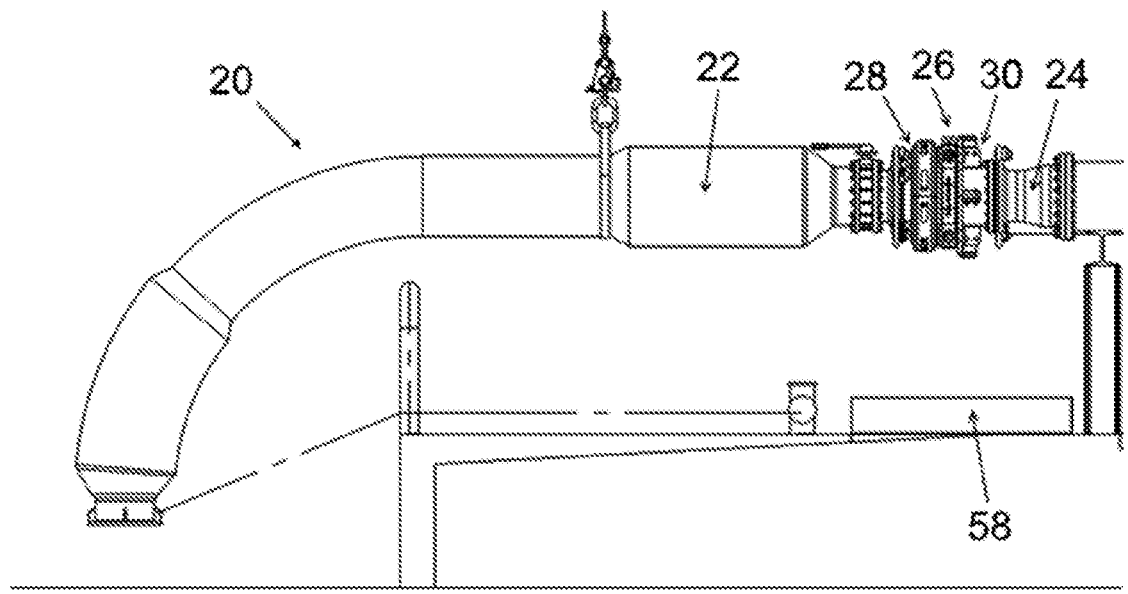
FIGS. 1a, 1b, 2a and 2b show connected and disconnected states of a fluid conduit assembly according to an embodiment of the invention.

The figures are not necessarily to scale, and certain features and certain views of the figures may be shown exaggerated in scale or in schematic form in the interests of clarity and conciseness.

DETAILED DESCRIPTION

The following embodiment of the invention is described with reference to a quick disconnect fluid conduit assembly comprising a tanker manifold and a flexible hose, but it will be appreciated that the following embodiment of the invention is applicable mutatis mutandis to other types of fluid conduit assemblies comprising rigid fluid conduits, flexible fluid conduits or a combination of rigid and flexible fluid conduits. Furthermore, the following embodiment of the invention is applicable mutatis mutandis to other applications requiring the releasable clamping of other types of objects.

A fluid conduit assembly according to an embodiment of the invention is shown in FIGS. 1a, 1b, 2a and 2b, and is designated generally by the reference numeral 20.

The fluid conduit assembly 20 comprises first and second fluid conduits 22,24 and a securing device 26. In use, the fluid conduit assembly 20 transports a fluid from one location to another location.

The first fluid conduit 24 is in the form of a flexible hose 22. The second fluid conduit 24 is in the form of a tanker manifold 24. In order to transfer a fluid from the tanker manifold 24 to the flexible hose 22, a first fluid conduit section 28 connected to an end of the flexible hose 22 is brought into abutting engagement with a second fluid conduit section 30 connected to an end of the tanker manifold 24. The connection of the first and second fluid conduit sections 28,30 to the flexible hose 22 and tanker manifold 24 respectively may be achieved using a wide range of fasteners, such as bolt fasteners and camlock couplers.

Each of the first and second fluid conduit sections 28,30 define a respective hollow bore along which flowable material may flow.

An abutment end of each of the fluid conduit sections 28,30 is formed to define a flange 32 extending about its circumference, and the flanges 32 define opposed contact surfaces which on abutment of the fluid conduit sections 28,30 are brought into abutting engagement.

In the first fluid conduit section 28, the flange 32 surrounds a cross-sectional face that is shaped to include an annular recess 34 that is wider in diameter than the hollow bore so that the cross-sectional face defines a female connecting face. In the second fluid conduit section 30, the flange 32 surrounds a cross-sectional face that is shaped to include an annular protrusion 36 formed around the hollow bore so that the cross-sectional face defines a male connecting face. The female and male connecting faces are brought into mating engagement by receiving the annular protrusion 36 of the second fluid conduit section 30 within the annular recess 34 of the first fluid conduit section 28.

A first O-ring seal is situated in grooves that are respectively formed on the opposing contact surfaces of the flanges 32. Second and third O-ring seals are situated in grooves formed in an outer circumference of the annular protrusion 36 so that, when the female and male connecting faces are brought into abutting engagement, the second and third O-ring seals engage an inner circumference of the annular recess 34. Each seal may be an elastomer O-ring seal.

A respective FLIP-FLAP™ shut-off valve 38 is located within the hollow bore of each fluid conduit section, and each shut-off valve 38 includes a shut-off valve member movable between a valve open position and a valve closed position. In the valve open position, each shut-off valve member bisects the hollow bore of the respective fluid conduit section to permit flowable material to flow along the hollow bore. In the valve closed position, the shut-off valve member sealingly engages against a valve seat defined about the circumference of the respective fluid conduit section and shuts off the flow of a flowable material through the hollow bore.

Each shut-off valve member is biased to move to its valve closed position on separation of the fluid conduit sections 28,30. Each shut-off valve member is mounted on a pivot shaft and is biased to move to its valve closed position by means of a spring. The spring preferably includes contra wound spring portions mounted on opposite ends of the pivot shaft and engaged with the shut-off valve members so as to bias each of the shut-off valve members towards the valve closed position.

The shut-off valves 38 are located in the fluid conduit sections 28,30 in opposed configurations such that, whilst the fluid conduit sections 28,30 are secured to each other, the opposing shut-off valve members interleave with each other when they are in their valve open positions. This engagement allows each shut-off valve member to oppose movement of the other shut-off valve member until separation of the fluid conduit sections 28,30 moves the shut-off valve members out of engagement with each other and the bias provided by the springs causes the shut-off valve members to move to their valve closed positions.

Since the first and second fluid sections are respectively fluidly coupled to the tanker manifold 24 and hose 22, bringing the first and second fluid conduit sections 28,30 into abutment fluidly interconnects the tanker manifold 24 and flexible hose 22. More specifically, connecting the fluid conduit sections 28,30 to each other permits fluid to be dispensed from the tanker manifold 24 to the hose 22, and disconnecting the fluid conduit sections 28,30 from each other fluidly disconnects the tanker manifold 24 from the hose 22.

In use, the fluid conduit sections 28,30 may be subject to an applied static or dynamic load, force or bending moment that causes relative axial movement between the connected fluid conduit sections 28,30. In turn, the relative axial movement between the fluid conduit sections 28,30 may adversely affect the fluid transmission performance of the fluid conduit assembly 20 that is reliant on a secure interconnection of the fluid conduit sections 28,30.

To ensure that the fluid conduit sections 28,30 are securely connected to each other, the securing device 26 is used to clamp the flanges 32 of the fluid conduit sections 28,30 together. The securing device 26 comprises a collar 40. The collar 40 includes a releasable securing member 42 and a joint assembly. The structure of the securing device 26 is described as follows with reference to FIGS. 3a to 9b.

In use, the collar 40 is closed to clamp the flanges 32 together in order to secure the fluid conduit sections 28,30 to each other, and the collar 40 is opened to release the flanges 32 in order to permit separation of the fluid conduit sections 28,30 from each other.

The collar 40 includes a pair of collar members 46 that are arranged around the flanges 32 of the fluid conduit sections 28,30. Internal profiles of the collar members 46 are shaped to correspond to outer profiles of the flanges 32 to enable the collar members 46 to provide effective clamping of the flanges 32 when the collar 40 is closed.

The joint assembly includes a joint member 44 in the form of a stud that interconnects first ends of the collar members 46. More specifically, a first end of the stud is mounted onto a trunnion assembly 48 that is housed within a first end of a first collar member 46, and a second end of the stud is mounted onto another trunnion assembly 48 that is housed within a first end of a second collar member 46. By using the trunnion assemblies 48 to connect the ends of the stud to the first ends of the collar members 46, each collar member 46 is pivotably coupled to the other collar member 46 at their first ends so as to allow pivotable movement of the collar members 46 relative to each other, and the joint member 44 is housed within the first ends of the collar members 46 to provide protection for the joint member 44. When the collar 40 is closed, the joint member 44 may be configured to be held under tension to apply a pulling force to the first ends of the collar members 46.

FIG. 6 shows a cross-sectional view of the releasable securing member 42. The releasable securing member 42 includes a pair of securing member portions that are in the form of bolt and nut portions 100,200 respectively. The bolt and nut portions 100,200 are configured to be coaxially connectable to each other to secure the second ends of the collar members 46 to each other, and are also configured to be coaxially disconnectable from each other to permit separation of the second ends of the collar members 46. The coaxial connection and disconnection of the bolt and nut portions 100,200 are described in detail below.

The bolt portion 100 includes a bolt head 102, a body 104 and a split shaft 106, with the body 104 connected between the bolt head 102 and the split shaft 106. A hollow bore extends throughout the bolt portion 100 from end to end so that the hollow bore extends through the bolt head 102, body 104 and split shaft 106.

The split shaft 106 includes a plurality of arms that are circumferentially arranged about the hollow bore of the bolt portion 100. Each arm is configured as a cantilevered arm with a first end defining a fixed end attached to the body and with a second end defining a free end 108. Each arm is separated from the neighbouring arms by respective gaps extending along both sides of the arm. In this way the split shaft 106 is configured as a plurality of cantilevered arms, each of which is radially deflectable outwards.

The hollow bore of the bolt portion 100 includes first and second bolt bore sections 110,112. The first bolt bore section 110 extends through the bolt head 102 and partway through the body 104. The second bolt bore section 112 extends partway through the body 104 and through the split shaft 106. The first bolt bore section 110 is wider than the second bolt bore section 112 and the first and second bolt bore sections 110,112 are interconnected within the body 104 so that a first annular radial shoulder is formed at the interconnection of the first and second bolt bore sections 110,112.

A rod 114 is located inside the hollow bore of the bolt portion 100.

A first end of the rod 114 defines a rod head 116 that is dimensioned to be slidably movable inside the first bolt bore section 110, with an O-ring seal providing a sealing engagement between the rod head 116 and an inner wall of the first bolt bore section 110. The O-ring seal sits inside a circumferential groove that is formed on an outer surface of the rod head 116. An open end of the first bolt bore section 110 defines a port 118 of the bolt portion 100. A space between the port 118 and the rod head 116 defines a chamber 120 of the bolt portion 100. In use, the chamber 120 may contain a hydraulic fluid.

A second end of the rod 114 defines a rod shaft 122 that is dimensioned to be slidably movable inside the second bolt bore section 112 and to extend past the free ends 108 of the cantilevered arms. A conical plug 124 is attached, using a securing nut 126, to the part of the rod shaft 122 extending past the free ends 108 of the cantilevered arms. A taper direction of an outer surface of the conical plug 124 is defined so that sliding the rod shaft 122 towards the bolt head 102 inserts the conical plug 124 into the second bolt bore section 112 to force the cantilevered arms to radially deflect outwards and so that sliding the rod shaft 122 away from the bolt head 102 removes the conical plug 124 from the second bolt bore section 112 to allow the cantilevered arms to move radially inwards to return to their original undeflected positions. The free ends 108 of the cantilevered arms are configured to form a counterbore that is wider than the second bolt bore section so that a second annular radial shoulder is formed at the interconnection of the second bolt bore section 112 and the counterbore. The conical plug includes a plug head 128 that is configured to engage the second annular radial shoulder when the conical plug 124 is fully inserted into the second bolt bore section 112.

In use, the rod 114 is slidable inside the hollow bore of the bolt portion 100 in a first direction away from the bolt head 102 and towards the split shaft 106 until the rod head 116 abuts the first annular radial shoulder, and the rod 114 is slidable inside the hollow bore of the bolt portion 100 in a second direction away from the split shaft 106 and towards the bolt head 102 until the conical plug 124 is fully inserted into the second bolt bore section 112 and the plug head 128 engages the second annular radial shoulder.

In this manner the rod 114 is configured as a piston that is slidably movable inside the hollow bore of the bolt portion 100 to enable selective outward radial deflection of the cantilevered arms.

Figure 5A:
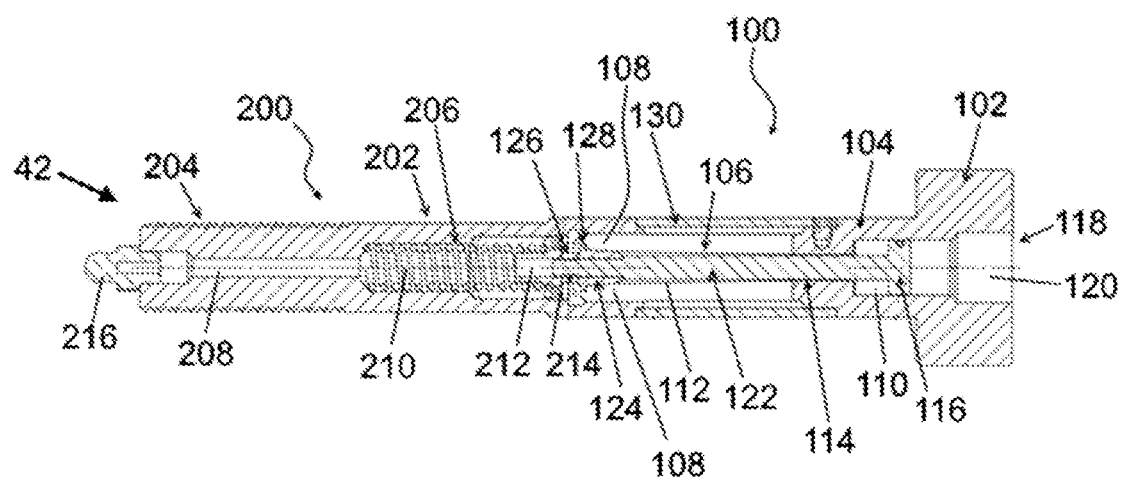
FIGS. 5a, 5b, 5c and 5d show features of a securing member of the securing device of FIGS. 3a, 3b, 3c, 4a and 4b.
Figure 5B:
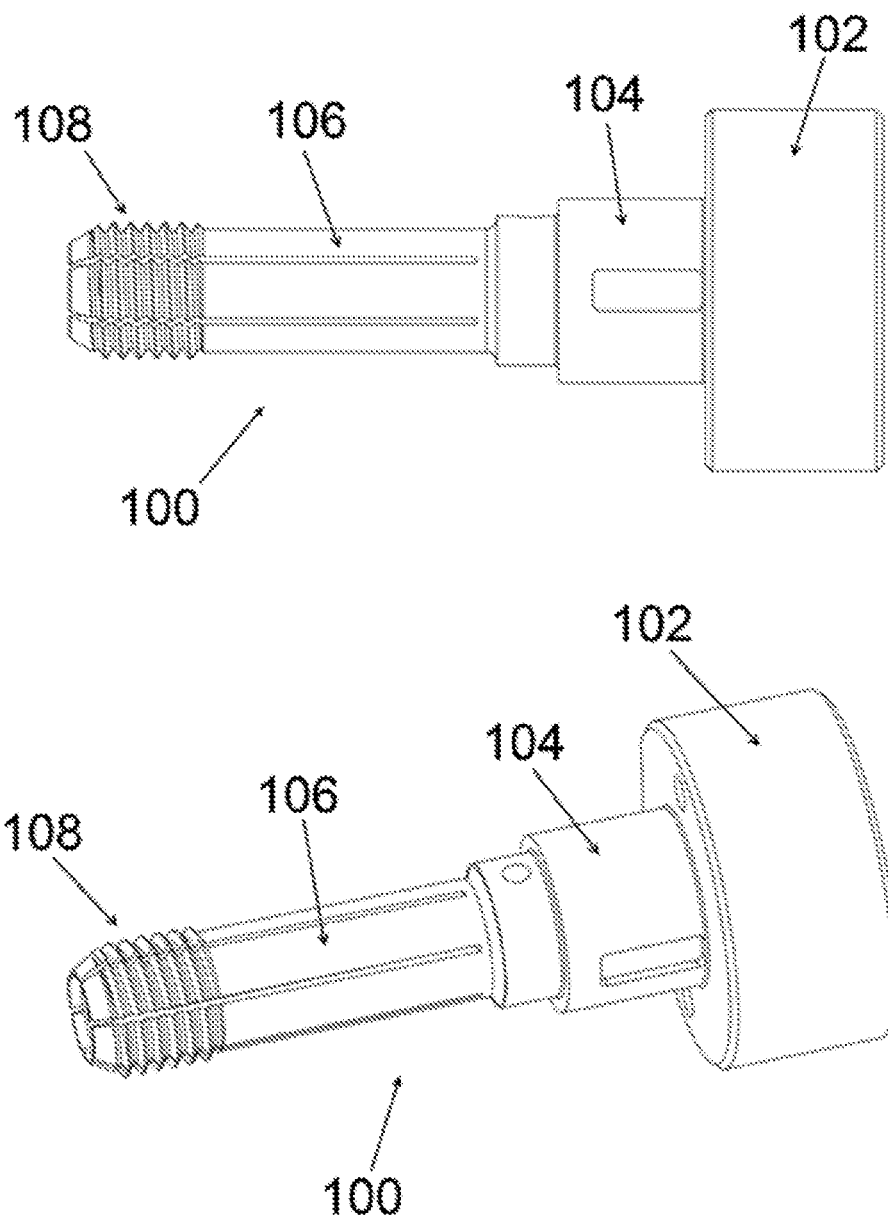

An external screw thread is formed on an outer surface of the free end 108 of each cantilevered arm, as shown in FIG. 5b.

An optional cylindrical tubular cover 130 is fastened to the body 104 to form a housing around the split shaft 106 to not only protect the plurality of arms but also limit the outward radial deflection of each arm.

The nut portion 200 includes a nut shaft having first and second ends 202,204, with the second end 204 having an external screw thread. The nut portion 200 has a hollow bore extending from end to end, with the hollow bore including first and second nut bore sections 206,208. The first nut bore section 206 extends partway through the first end 202 of the nut shaft. The second nut bore portion 208 extends partway through the first end 202 of the nut shaft and extends through the second end 204 of the nut shaft. The first nut bore section 206 is wider than the second nut bore section 208 and the first and second nut bore sections 206,208 are interconnected within the nut shaft so that a third annular radial shoulder is formed at the interconnection of the first and second nut bore sections 206,208.

A spring 210 is housed within the first nut bore section 206 so that one end of the spring engages the third annual radial shoulder. A washer 212 is attached to the other end of the spring 210. An annular circlip 214 is arranged inside the first nut bore section 206 to be offset from an open end of the first nut bore section 206 in order to retain the spring 210 and washer 212 inside the first nut bore section 206.

An internal screw thread is formed on an inner surface of the first nut bore section 206, where the internal screw thread is configured to matingly correspond to the external screw thread on the outer surfaces of the free ends 108 of the cantilevered arms.

An optional grease nipple 216 is inserted into an open end of the second nut bore section 208.

Figure 7A:
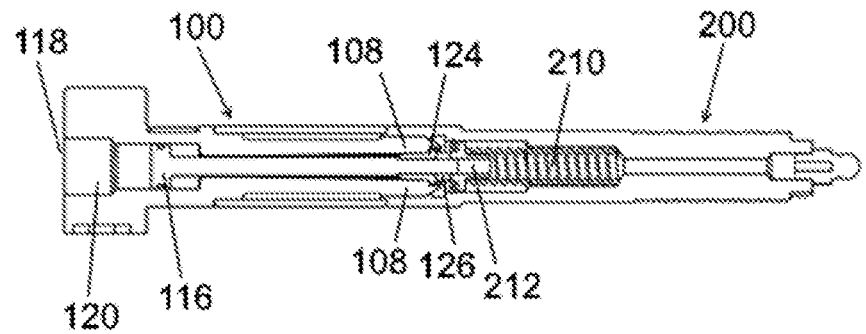
FIGS. 7a and 7b show cross-sectional and close-up cross-sectional views of the securing member of FIG. 5 in a coaxially connected configuration.
Figure 7B:
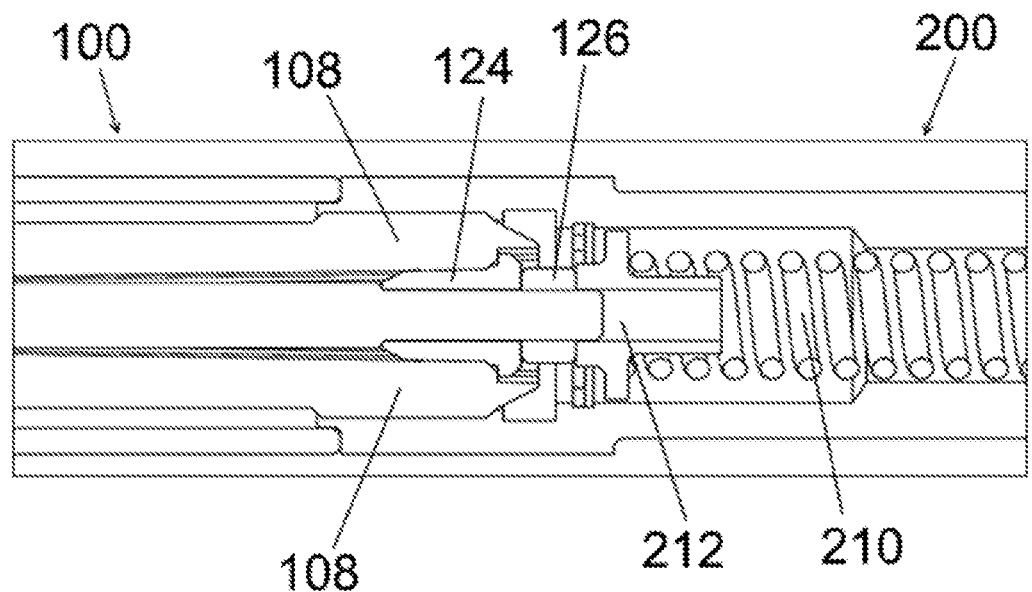

To coaxially connect the bolt and nut portions 100,200, the conical plug 124 is inserted into the second bolt bore section 208 to force the cantilevered arms to radially deflect outwards so that the external screw thread on the outer surfaces of the free ends 108 of the cantilevered arms is parallelly aligned with the internal screw thread on the inner surface of the first nut bore section 110. The free ends 108 of the cantilevered arms are then inserted into the open end of the first nut bore section 206 by screwing the bolt and nut portions 100,200 together so that the external screw thread on the outer surfaces of the free ends 108 of the cantilevered arms is in mating engagement with the internal screw thread on the inner surface of the first nut bore section 110. As a result, the free ends 108 of the cantilevered arms are housed inside the first nut bore section 206 and the securing nut 126 abuts the washer 212. A biasing force applied by the spring 210 causes the washer 212 to push against the securing nut 126 and conical plug 124 in order to help retain the conical plug 124 inside the second bolt bore section 208 so that the cantilevered arms maintain their outward radial deflections. In this way the bolt and nut portions 100,200 are locked together to complete the coaxial connection of the bolt and nut portions 100,200. FIGS. 7a and 7b show the bolt and nut portions 100,200 in a coaxially connected configuration.

Figure 8A:
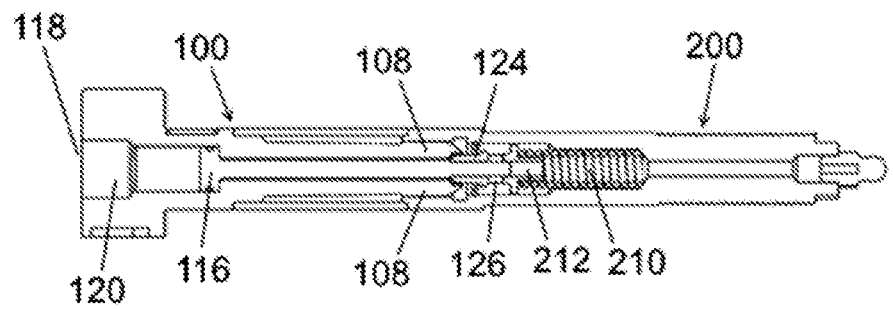
FIGS. 8a and 8b show cross-sectional and close-up cross-sectional views of the securing member of FIG. 5 in a partially coaxially disconnected configuration.
Figure 8B:
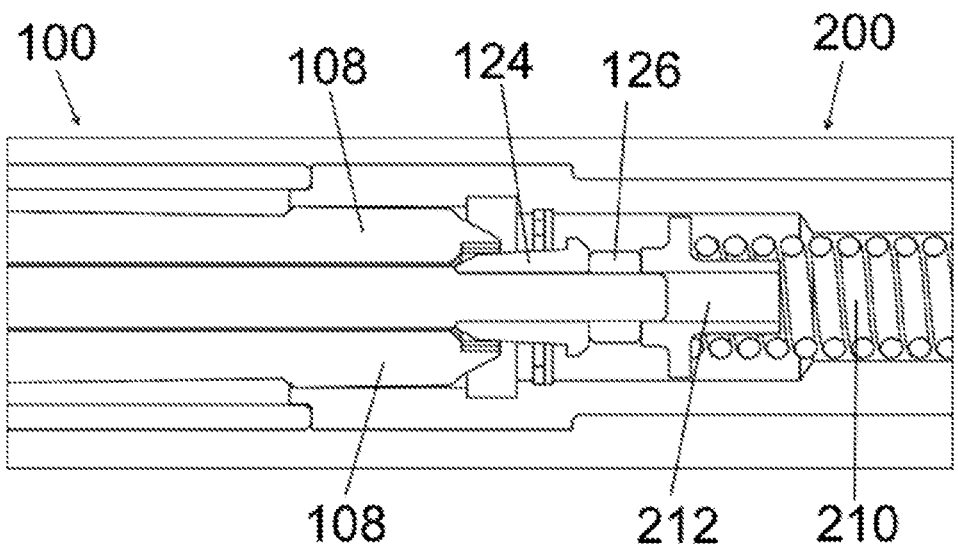
Figure 9A:
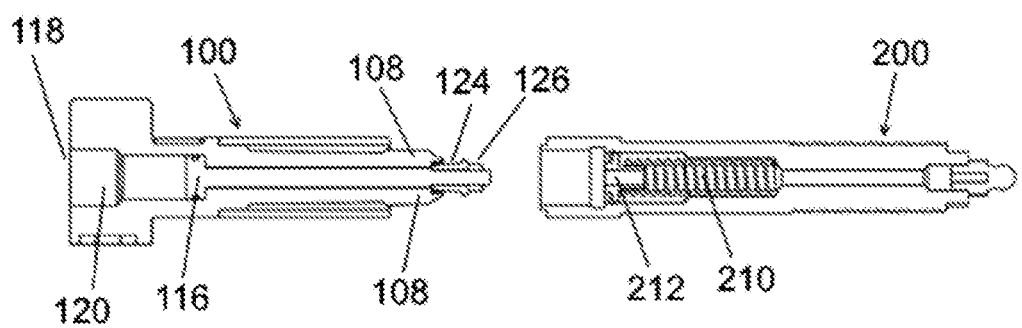
FIGS. 9a and 9b show cross-sectional and close-up cross-sectional views of the securing member of FIG. 5 in a fully coaxially disconnected configuration.
Figure 9B:
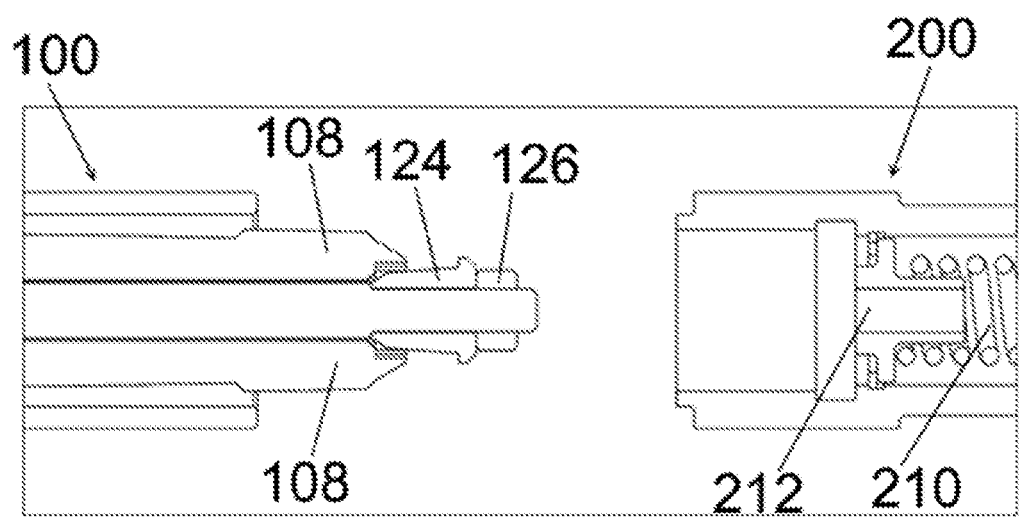

To coaxially disconnect the bolt and nut portions 100,200, a hydraulic pressure inside the chamber 120 of the bolt portion 100 is increased so that the hydraulic fluid displaces the rod head 116 to push the rod 114 in the first direction away from the bolt head 102 and towards the split shaft 106. This not only causes the conical plug 124 to exit the second bolt bore section 112 to allow the cantilevered arms to move radially inwards to return to their original undeflected positions but also causes the securing nut 126 and conical plug 124 to push against the washer 212 to compress the spring 210. As a result, the free ends 108 of the cantilevered arms disengage from the inner wall of the first nut bore section 110, as shown in FIGS. 8a and 8b. The compressed spring 210 then applies a biasing force that causes the washer 212 to push against the securing nut 126 and conical plug 124. Since the free ends 108 of the cantilevered arms are disengaged from the inner wall of the first nut bore section 110, the bolt and nut portions 100,200 are able to separate from each other to complete the coaxial disconnection of the bolt and nut portions 100,200. FIGS. 9a and 9b show the bolt and nut portions 100,200 in a coaxially disconnected configuration.

Figure 5C:
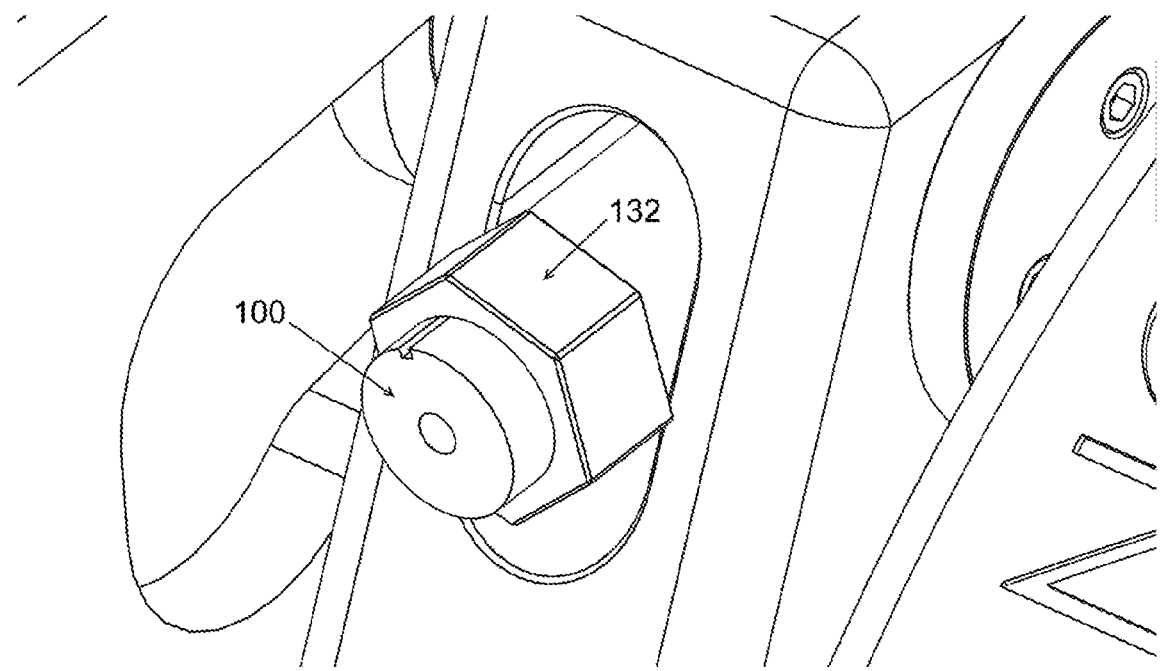
Figure 5D:
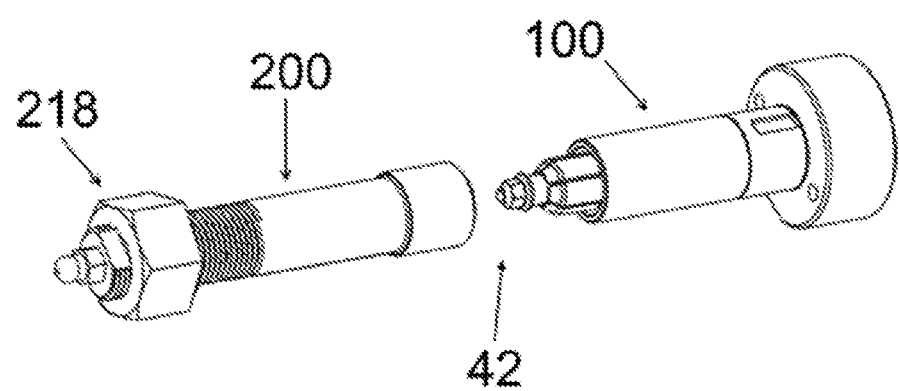
Figure 6A:
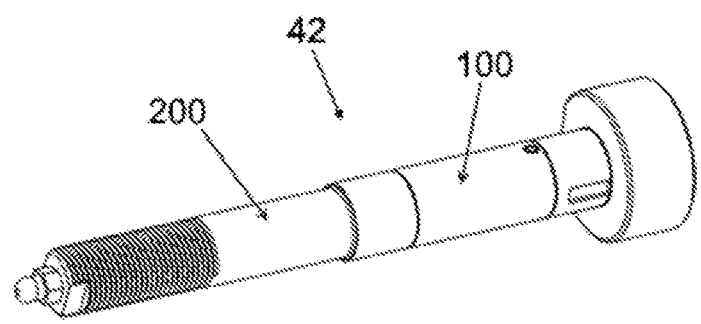
FIGS. 6a and 6b show perspective and cutaway perspective views of the securing member of FIG. 5 in a coaxially connected configuration.
Figure 6B:
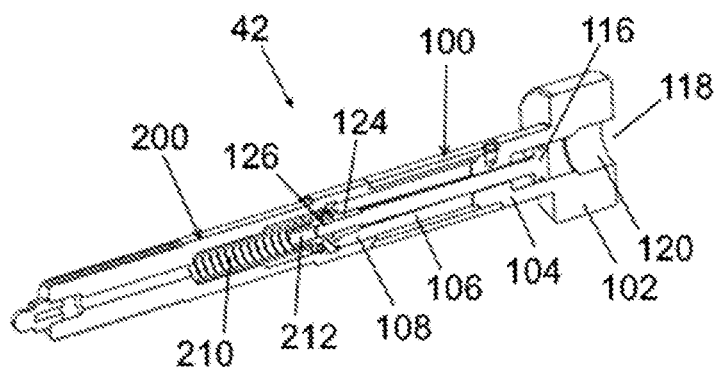
Figure 6C:
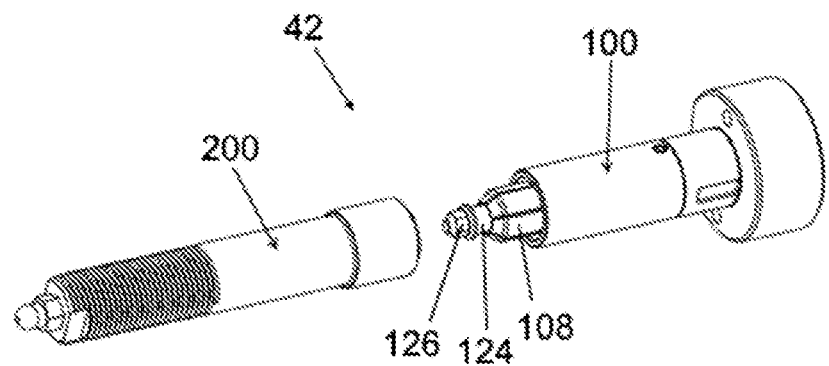
FIGS. 6c and 6d show perspective and cutaway perspective views of the securing member of FIG. 5 in a fully coaxially disconnected configuration.
Figure 6D:
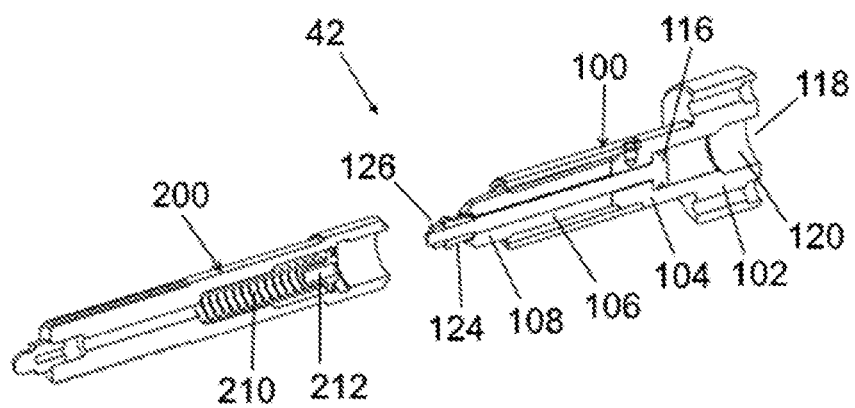

A first of the securing member portions is mounted onto a trunnion assembly 50 that is housed within a second end of the first collar member 46, and a second of the securing member portions is mounted onto another trunnion assembly 50 that is housed within a second end of the first collar member 46. More specifically, a securing nut 132 may be used to secure the bolt portion 100 to the corresponding trunnion assembly 50 as shown in FIG. 5c, and the external screw thread on the second end 204 of the nut shaft allows the nut portion 200 to be secured to the corresponding trunnion assembly 50 by using a securing nut 218 on the external screw thread as shown in FIG. 5d. In other embodiments, it is envisaged that the nut portion 200 is secured to the corresponding trunnion assembly 50 by mating the external screw thread with an internal screw thread in the corresponding trunnion assembly 50. By using the trunnion assemblies 50 to connect the securing member portions to the second ends of the collar members 46, the securing member 42 is housed within the second ends of the collar members 46 to provide protection for the securing member 42.

The securing device 26 further includes a support cage 52 mounted on the tanker manifold 24 adjacent to the collar 40.

Each trunnion assembly 48 at the first end of the respective collar member 46 is fixedly attached to slots formed in a lower end of the support cage 52.

Each trunnion assembly 50 at the second end of the respective collar member 46 is arranged to be slidably movable within guide slots 54 formed in an upper end of the support cage 52. Each guide slot 54 is oriented at a non-zero angle, i.e. inclined, with respect to a horizontal line passing through the support cage 52 so that proximal ends of the guide slots 54 located near a centreline of the support cage 52 are positioned to be higher than distal ends of the guide slots 54 located away from the centreline. To connect the securing member portions to each other, the trunnion assemblies 50 are slidable in the respective guide slots 54 upwards and towards each other. When the securing member portions are disconnected from each other, the trunnion assemblies 50 are slidable in the respective guide slots 54 downwards and away from each other.

The securing device 26 further includes an actuation mechanism having a hydraulic driving assembly that includes a hydraulic actuator (not shown) capable of selectively controlling the flow of a volume of hydraulic fluid (e.g. oil) under pressure (not shown). The hydraulic actuator is hydraulically connected via a hydraulic line to the port 118 of the bolt portion 100 of the securing device 26. This enables the hydraulic actuator to, in use, increase a hydraulic pressure in the chamber 120 of the bolt portion 100 of the securing device 26 in order to coaxially disconnect the securing member portions from each other.

The actuation mechanism enables remote operation of the hydraulic driving assembly to hydraulically drive the securing device 26 to actively control the coaxial disconnection of the securing member portions from each other, which in turn improves safety and reduces operational time by removing the need for personnel to directly access the securing device 26 during and after the opening of the collar 40, and obviates the costs of providing and operating additional infrastructure and equipment required to directly access the securing device 26.

The actuation mechanism could, for example, be operated when:
personnel or sensors determine that it is no longer safe or desirable to continue clamping the objects together;
sensors detect an abnormal condition of, or associated with, the fluid conduits 22,24. Such an abnormal condition may be a tensile load applied to the fluid conduits 22,24 that exceeds a predetermined tensile limit or rating, which may arise as a result of unexpected movement of the fluid conduits 22,24 or due to excessive pressure within the fluid conduits 22,24;
personnel and/or sensors determine that maintenance, repair or servicing of the fluid conduits 22,24 is required.

It is envisaged that, in other embodiments of the invention, the hydraulic driving assembly may be replaced by a pneumatic driving assembly that includes a pneumatic actuator capable of selectively controlling the flow of a volume of air under pressure (not shown). The pneumatic actuator is pneumatically connected via a pneumatic line to the port 118 of the bolt portion 100 of the securing device 26. This enables the pneumatic actuator to, in use, increase a pneumatic pressure in the chamber 120 of the bolt portion 100 of the securing device 26 in order to coaxially disconnect the securing member portions from each other.

It is envisaged that the actuation mechanism could be operated remotely from a ship or shore-based control room. It is also envisaged that each hydraulic actuator may include a stab plate or a tail hose 22 to enable remote operation of the actuation mechanism.

It is also envisaged that the actuation mechanism could be operated locally, e.g. by using a local control unit in the vicinity of the actuation mechanism. The local control unit may include a hydraulic power unit (or a pneumatic power unit as the case may be). The local control unit may be sized to be portable, e.g. like a briefcase, so that it can be easily carried by a human operator.

An operation of the securing device 26 to carry out connection and disconnection of the fluid conduit sections 28,30 is described with reference to FIGS. 1a to 5d.

The tanker manifold 24 is located on a deck of a ship. The hose 22 extends from the point of connection with the tanker manifold 24 towards and over the edge of the ship. It will be appreciated that the hose 22 may stay completely above the deck instead of hanging over the edge of the ship. The position of the tanker manifold 24 is fixed relative to the deck while the position of the hose 22 may vary relative to the ship due to its susceptibility to movement caused by wave motion or fluid pressure within the hose 22. Hose 22 saddles and cradles may be used to stabilise the position of the hose 22.

For the purpose of illustrating how the securing device 26 works, crude oil is used as the fluid transferred from the tanker manifold 24 to the hose 22. During the transfer of crude oil through the tanker manifold 24 and hose 22, the securing member portions are coaxially connected to each other so that the collar 40 securely clamps the flanges 32 of the fluid conduit sections 28,30 together in order to ensure that the fluid conduit sections 28,30 stay connected under dynamic internal fluid pressure and external bending loads. When the second ends of the collar members 46 are secured to each other via the securing member 42, the trunnion assemblies 50 at the second ends of the collar members 46 are located at the proximal ends of the respective guide slots 54, and the joint member 44 is pre-tensioned to apply a pulling force to the first ends of the collar members 46.

Figure 1B:
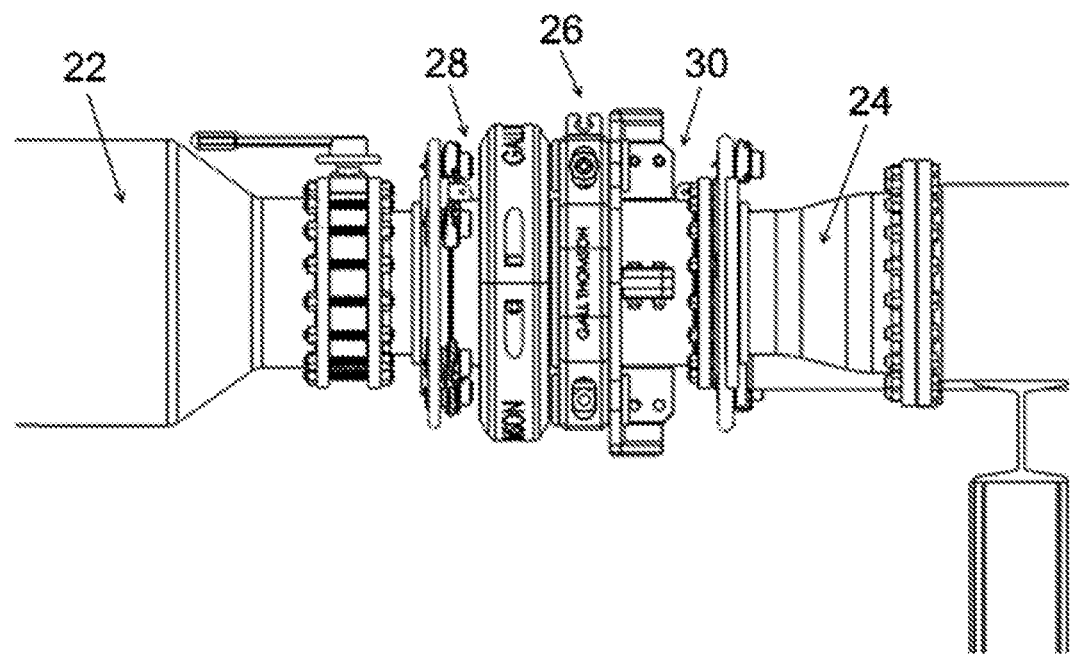
Figure 3A:
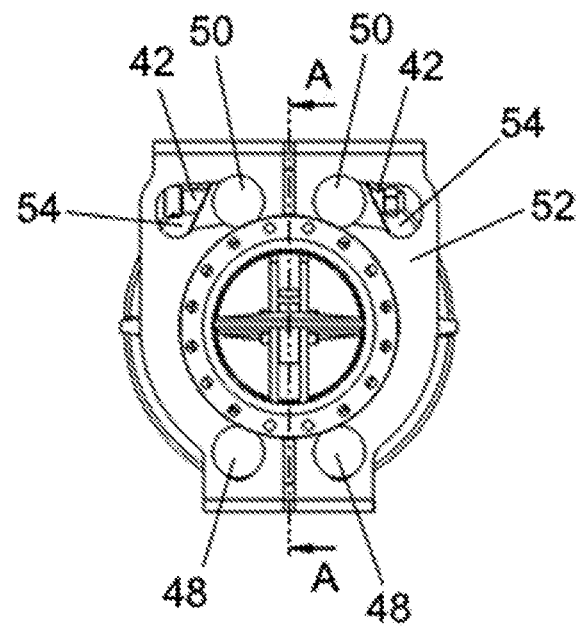
FIGS. 3a to 3c show a securing device of the fluid conduit assembly that is in the connected state of FIGS. 1a and 1b.
Figure 3B:
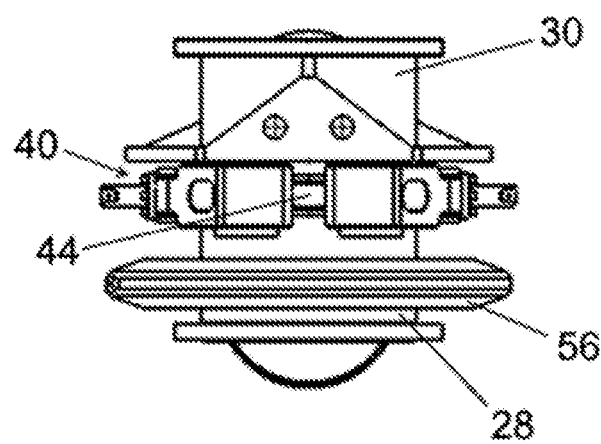
Figure 3C:
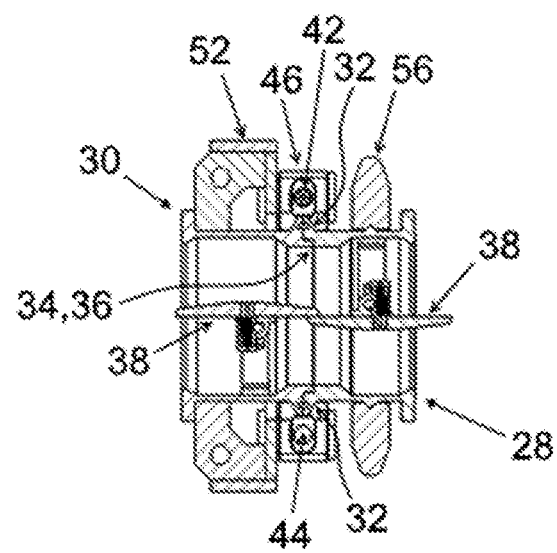
Figure 10A:
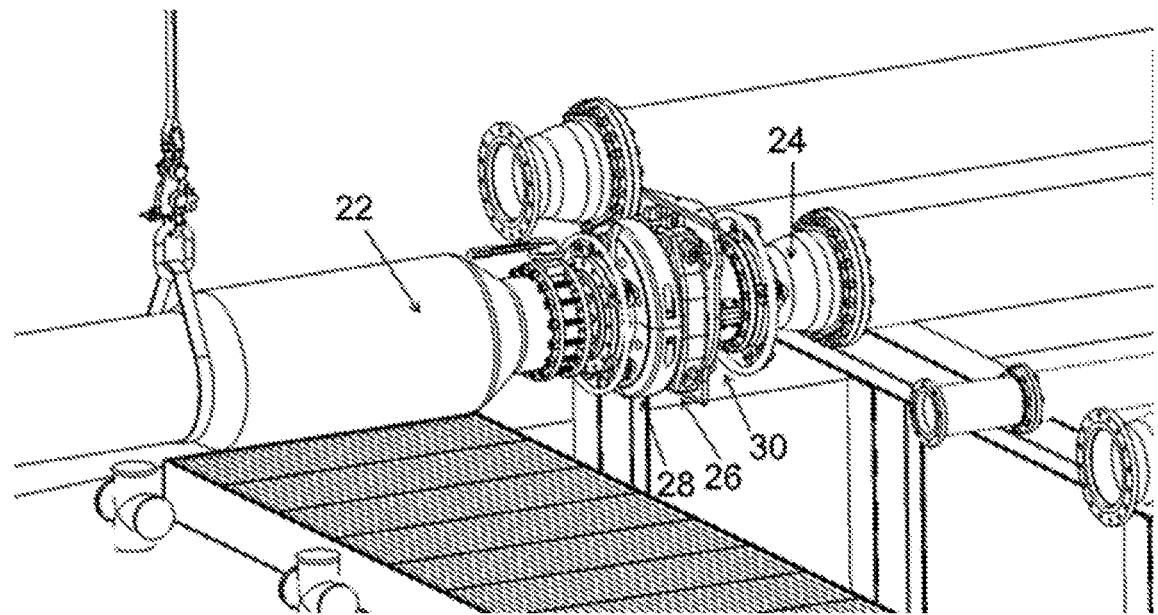
FIGS. 10a to 10d show perspective and cutaway perspective views of the connected and disconnected states of the fluid conduit assembly of FIGS. 1a, 1b, 2a and 2b.
Figure 10B:
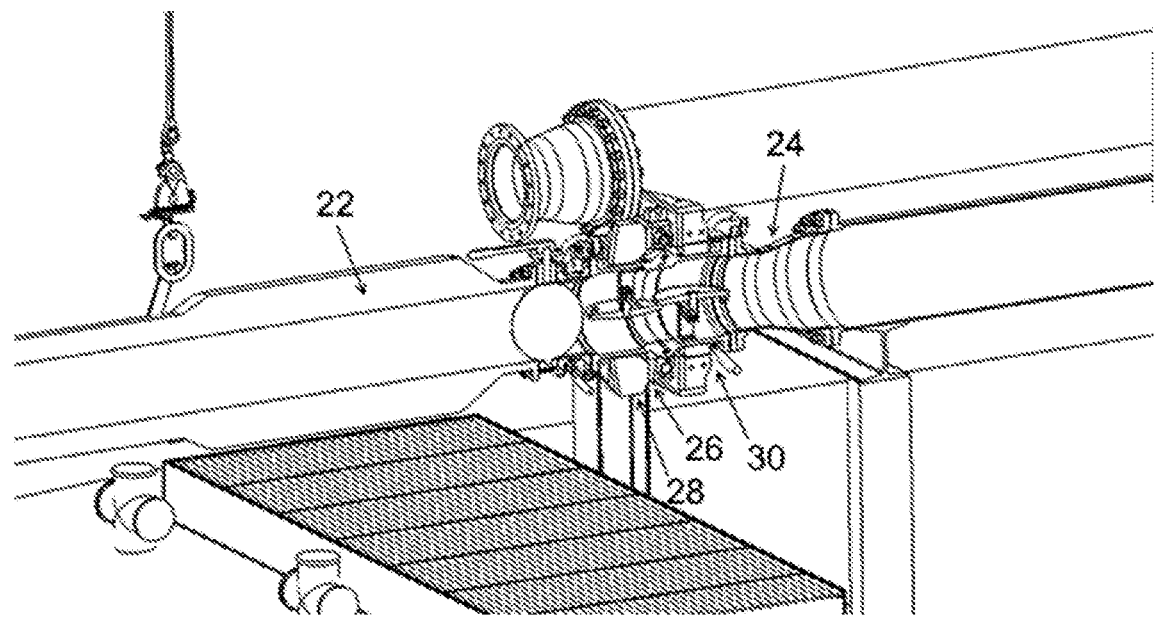

FIGS. 1a and 1b show a connected state of the fluid conduit assembly 20 in which the fluid conduit sections 28,30 are connected. FIGS. 3a and 3b show front and bottom views of the securing device 26 in the connected state of the fluid conduit assembly 20, and FIG. 3c shows a cross-sectional view along lines A-A of FIG. 3a. FIGS. 10a and 10b show perspective and cutaway perspective views of the connected state of the fluid conduit assembly 20.

Under certain circumstances, it may be desirable to disconnect the hose 22 from the tanker manifold 24. Examples of such circumstances are described elsewhere throughout the specification.

To initiate the disconnection of the hose 22 from the tanker manifold 24, a control signal is sent from a remote or local control unit to the hydraulic driving assembly, which then operates the hydraulic actuator to increase a hydraulic pressure in the chamber 120 of the bolt portion 100 of the securing device 26. When the hydraulic pressure in the chamber 120 of the bolt portion 100 of the securing device 26 reaches a target pressure threshold, the securing member portions are driven to coaxially disconnect from each other. The speed of disconnection of the securing member portions may be proportional to the speed of the hydraulic actuation, the amount of hydraulic pressure inside the chamber 120 of the bolt portion 100 and any load applied to the securing member 42. Disconnection speeds under 1 second are possible.

Following the disconnection of the securing member portions from each other, the collar members 46 are permitted to pivot about the respective trunnion assemblies 48 at their respective first ends to separate the second ends of the collar members 46. During the pivotal movement of the collar members 46, the trunnion assemblies 50 at the second ends of the collar members 46 slide towards the distal ends of the respective guide slots 54 downwards and away from each other. The pulling force applied by the pre-tensioned joint member 44 to the first ends of the collar members 46 aids the pivotable movement of the collar members 46 relative to each other to separate the second ends of the collar members 46. Since the trunnion assemblies 48,50 are attached to the upper and lower ends of the support cage 52, the open collar 40 is held by the support cage 52 to prevent it from falling onto the deck, which otherwise might cause damage to the collar 40 and deck.

The separation of the second ends of the collar members 46 provides sufficient clearance between the collar members 46 and the flanges 32 so that the flanges 32 are released from the collar 40 and the fluid conduit sections 28,30 are permitted to separate from each other. The relatively short length of the annular protrusion 36 of the second fluid conduit section 30 and the weight of the first fluid conduit section 28 allows the first fluid conduit section 28 and hose 22 to fall away from the second fluid conduit section 30 and tanker manifold 24. A bump ring 56 mounted on the first fluid conduit section 28 provides the first fluid conduit section 28 and hose 22 with protection against impact when they fall away from the second fluid conduit section 30 and tanker manifold 24.

The disconnection of the fluid conduit sections 28,30 results in disengagement of the shut-off valves 38 from each other, which in turn enables the bias provided by the springs to cause the shut-off valve members to move to their valve closed positions. The shut-off valves 38 are arranged so that, during the disconnection of the first and second fluid conduit sections 28,30, the closure of the shut-off valves 38 take place before the O-ring seals stop providing a sealing engagement between the first and second fluid conduit sections 28,30. This results in a crude oil spillage volume that is less than or equal to the volume between the two closed shut-off valves 38. A crude oil spill tank 58 is located underneath the first and second fluid conduit sections 28,30 to collect any crude oil spillage resulting from the disconnection of the first and second fluid conduit sections 28,30.

Figure 2A:
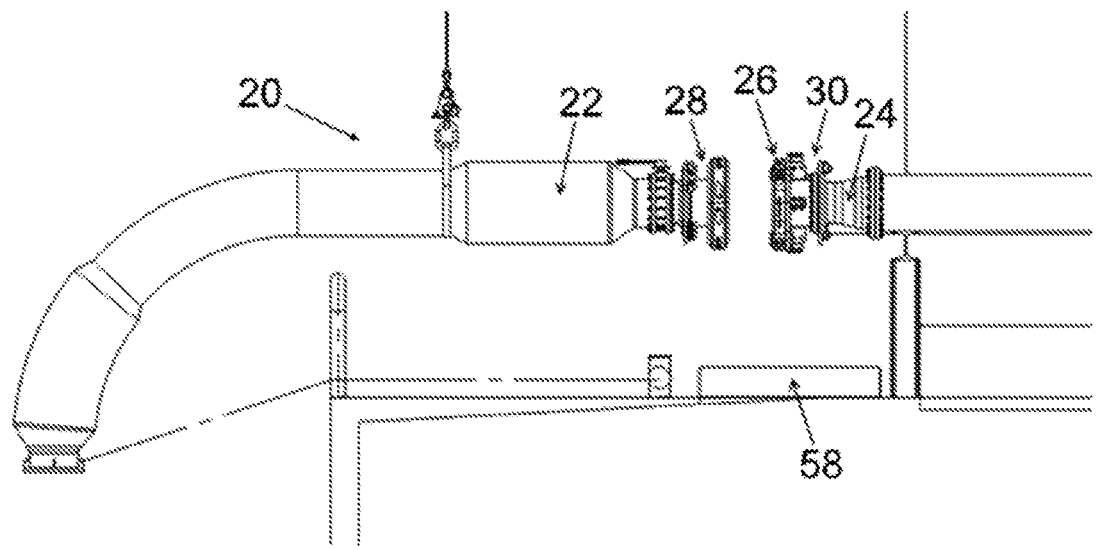
Figure 2B:
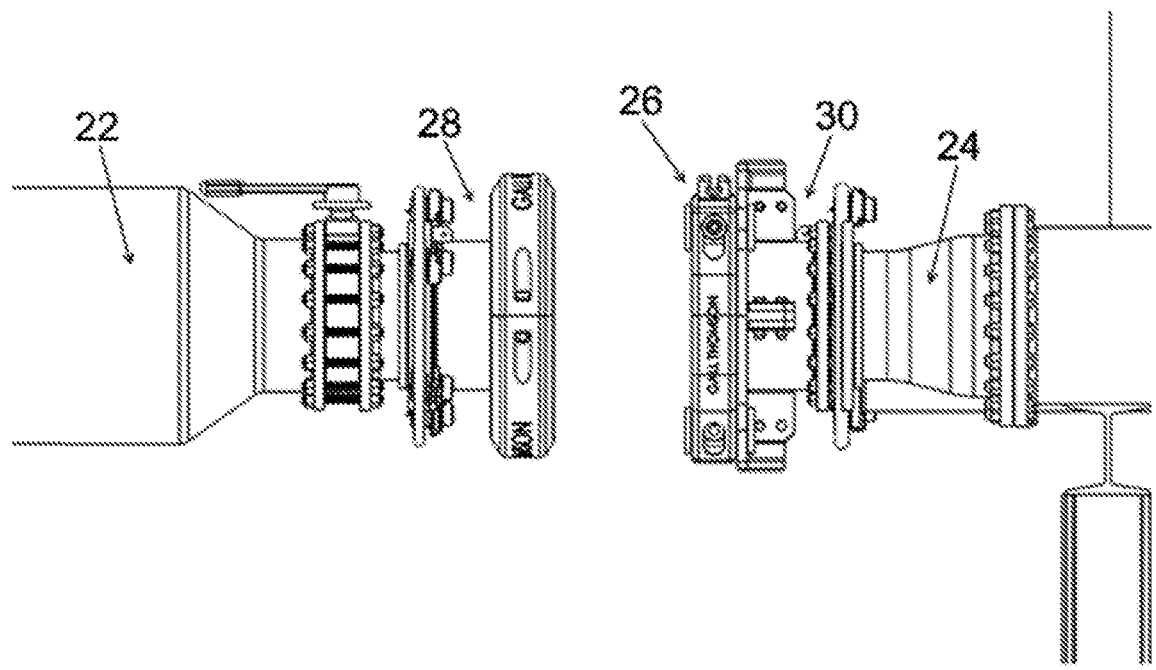
Figure 4A:
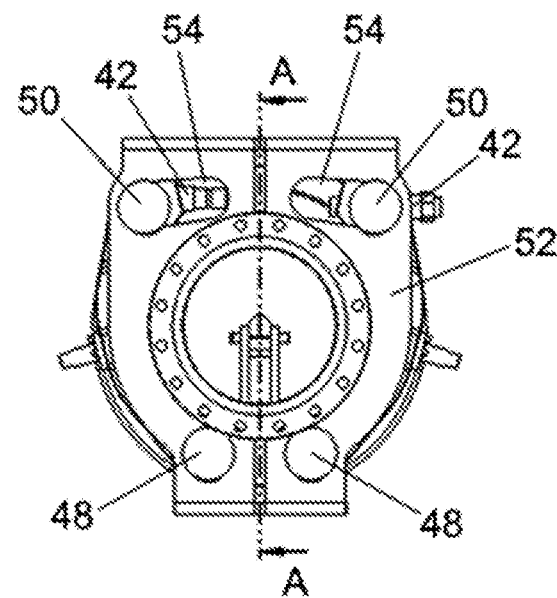
FIGS. 4a and 4b show a securing device of the fluid conduit assembly that is in the disconnected state of FIGS. 2a and 2b.
Figure 4B:
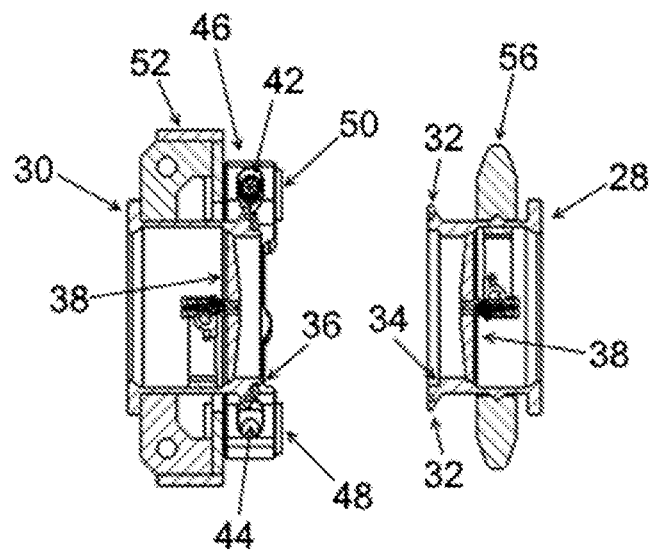
Figure 10C:
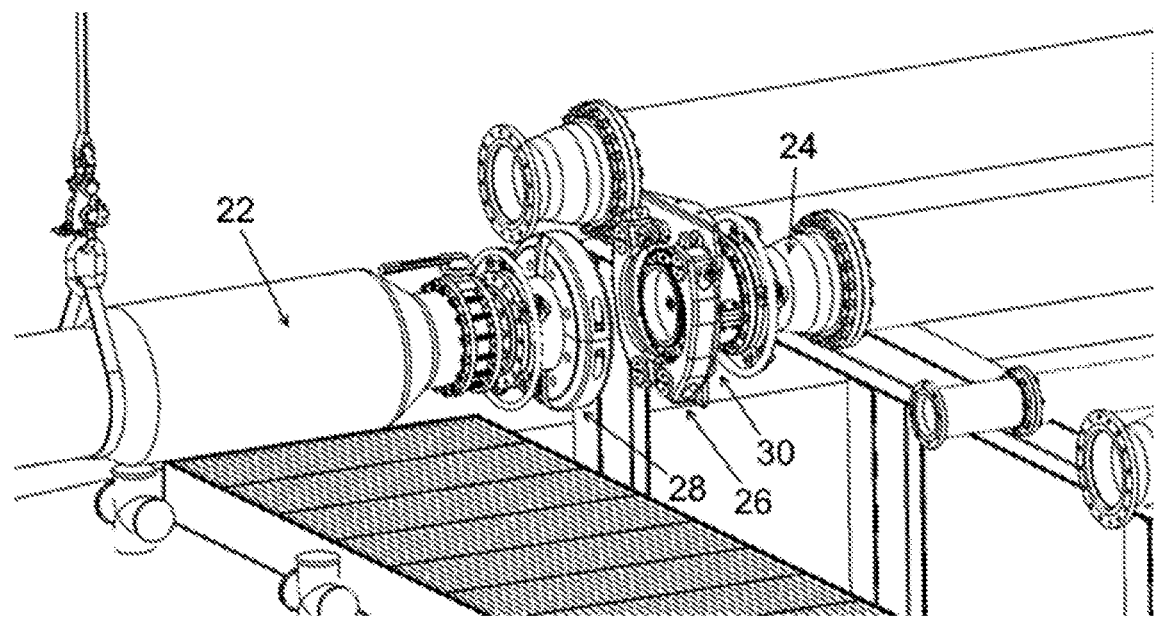
Figure 10D:
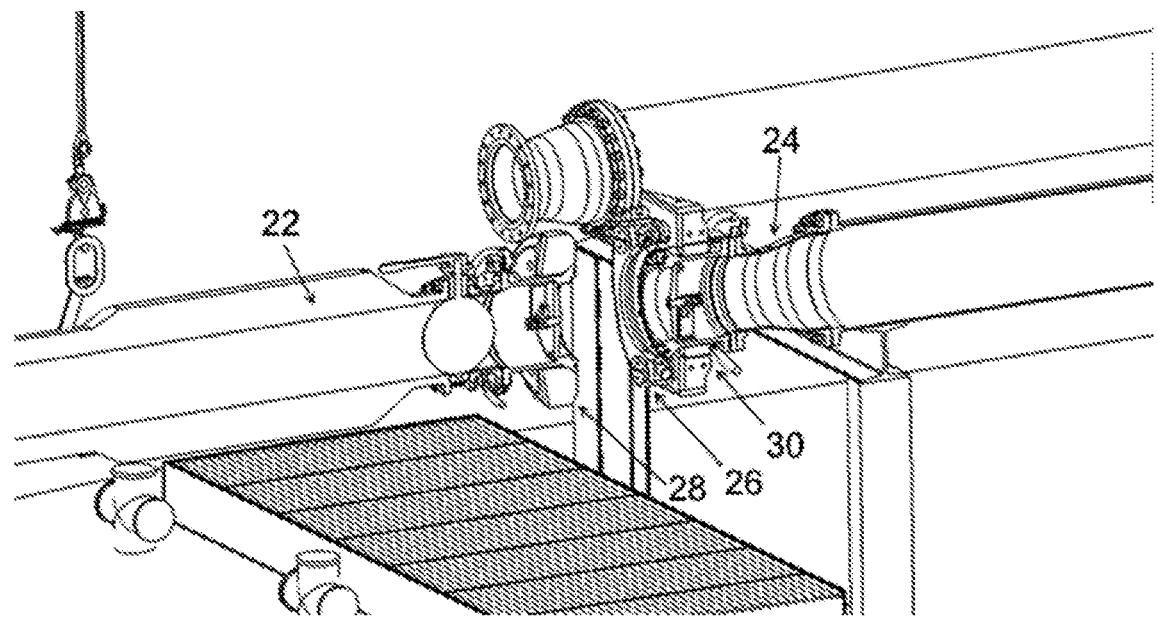

FIGS. 2a and 2b show a disconnected state of the fluid conduit assembly 20 in which the fluid conduit sections 28,30 are disconnected. FIG. 4a shows a front view of the securing device 26 in the disconnected state of the fluid conduit assembly 20, and FIG. 4b shows a cross-sectional view along lines A-A of FIG. 4a. FIGS. 10c and 10d show perspective and cutaway perspective views of the disconnected state of the fluid conduit assembly 20.

Thereafter, if required, the first and second fluid conduit sections 28,30 may be reconnected by bringing the flanges 32 of the first and second fluid conduit sections 28,30 into abutting engagement, positioning the collar members 46 around the flanges 32 and then closing the collar 40 to securely clamp the flanges 32 together by releasing the hydraulic pressure in the chamber 120 of the bolt portion 100, coaxially reconnecting the securing member portions, and mounting the reassembled securing member 42 onto the trunnion assemblies 50 by reattaching the securing nuts 132,218 and applying a torque to the securing nuts 132,218, preferably using a spanner or wrench.

The configuration of the collar members 46, securing member 42 and trunnion assemblies 48,50 in the securing device 26 therefore enables the coaxial connection and disconnection of the securing member portions to take place in the same plane as the pivotable movement of the collar members 46 relative to each other. This not only allows for a more compact structural configuration of the collar members 46 and securing member 42 but also reduces the space required to accommodate the closing and opening of the collar 40, thus permitting the use of the securing device 26 in narrower spaces. Furthermore, since the coaxial connection and disconnection of the securing member portions take place in the same plane as the pivotable movement of the collar members 46 relative to each other, the second ends of the collar members 46 can be secured to each other or separated in a smooth motion with minimal displacement and movement.

The securing device 26 not only enables the performance of quick connection and disconnection of the tanker manifold 24 and hose 22 on demand, but also provides another point of disconnection in a fluid transmission system that provides increased assurance with regards to protecting assets, personnel and the environment during or prior to adverse conditions or an emergency, such as bad weather or a fire incident.

Other optional features of the fluid conduit assembly of the invention are described as follows and elsewhere in this specification.

In the embodiment shown, the securing device 26 is used as a quick disconnect coupling. It is envisaged that, in other embodiments of the invention, the securing device may be used as or in a breakaway coupling (such as a marine breakaway coupling) or a release coupling (such as an emergency release coupling).

In the embodiment shown, a common axis extending along the lengths of the hollow bores of the fluid conduit sections 28,30 is oriented along a horizontal plane. It will be appreciated that the invention is applicable mutatis mutandis to fluid conduit assemblies in which the common axis extending along the lengths of the hollow bores of the fluid conduit sections is oriented along a different plane, such as a vertical plane or a plane that is inclined with respect of the horizontal and vertical planes.

The collar members may be made out of carbon steel. The trunnion assemblies may be made out of stainless steel. The securing member and joint member may be made out of stainless steel and/or aluminium bronze.

The joint member of the invention may take any shape but is preferably an elongate member. The securing member of the invention may take any shape but is preferably an elongate member. The elongate member may be a bolt, pin or bar.

In the embodiment shown, the securing member is configured as a two-piece securing member that consists of a pair of securing member portions. In other embodiments, the securing member may include three or more securing member portions.

Each of the first and second fluid conduit sections may form part of, or may be connectable to, a flexible fluid conduit. Alternatively, each of the first and second fluid conduit sections may form part of, or may be connectable to, a rigid fluid conduit. Further alternatively, one of the first and second fluid conduit sections may form part of, or may be connectable to, a flexible fluid conduit and the other of the first and second fluid conduit sections may form part of, or may be connectable to, a rigid fluid conduit.

Each fluid conduit or each fluid conduit section may have a fixed or variable position.

In embodiments of the invention, one of the first and second fluid conduit sections may be the upstream fluid conduit section, and the other of the first and second fluid conduit sections may be the downstream fluid conduit section.

In the embodiment shown, the shut-off valve arrangement is referred to by the applicant as a FLIP-FLAP™ valve arrangement, examples of which are described in EP 2 000 730 A2. It is envisaged that, in other embodiments of the invention, the shut-off valve arrangement may be replaced by other shut-off valve arrangements, including a valve arrangement referred to by the applicant as a PETAL VALVE™ arrangement (such as described in EP 0 006 278 A1 and GB 2051993 A) and a sleeve-based valve arrangement (such as described in GB 2391051 A).

An exemplary PETAL VALVE™ arrangement is described as follows.

A respective shut-off valve in the form of a PETAL VALVE™ valve is located within the hollow bore of each fluid conduit section. Each shut-off valve includes a plurality of petal elements, each of which has a pivot member and a valve member. It will be understood that each shut-off valve may include any number of petal elements. The plurality of petal elements may be identical in shape and/or size, or may differ from each other in terms of their shapes and/or sizes.

The valve member of each petal element is pivotally movable relative to the hollow bore via the respective pivot member that is pivotally mounted to an inner wall of the respective fluid conduit section. Each petal element is rotatable between a fully retracted position which corresponds to a valve open position of the corresponding shut-off valve, and a fully extended position which corresponds to a valve closed position of the corresponding shut-off valve. In the valve closed position of each shut-off valve, all the valve members abut one another to form a cone which faces or opposes the direction of flow of the flowable material along the fluid conduit assembly. For each shut-off valve, the apex of the cone defines a meeting point for all the petal elements when the shut-off valve is in the valve closed position. It will be appreciated that the edge of one or more of the petal elements may optionally include a seal formed thereon.

An exemplary sleeve-based valve arrangement is described as follows.

The fluid conduit assembly further includes an internal sleeve arranged within the fluid conduit sections. When the fluid conduit sections are secured to each other, the internal sleeve is arranged to push against both shut-off valves so that their petal elements are in their fully retracted positions and the shut-off valves are in their valve open positions. When the fluid conduit sections separate from each other, the internal sleeve is arranged to move away from the shut-off valves so that their petal elements are allowed to move from their fully retracted positions to their fully extended positions in order to close the shut-off valves.

In still other embodiments of the invention, it is envisaged that the fluid conduit assembly may include only one of the shut-off valves, with the single shut-off valve being located in one of the fluid conduit sections. In such embodiments, a separate mechanism may be used to oppose the movement of the valve member of the single shut-off valve in order to maintain the valve member in its valve open position when the fluid conduit sections are secured to each other.

Preferences and options for a given aspect, feature or parameter of the invention should, unless the context indicates otherwise, be regarded as having been disclosed in combination with any and all preferences and options for all other aspects, features and parameters of the invention.

The listing or discussion of an apparently prior published document in this specification should not necessarily be taken as an acknowledgement that the document is part of the state of the art or is common general knowledge.

The invention claimed is:

1. A securing device comprising a collar for releasably clamping first and second objects together, wherein the collar includes a pair of collar members, each of the collar members being pivotably coupled to the other collar member at or towards a first end so as to allow pivotable movement of the collar members relative to each other, the collar including a releasable securing member that includes securing member portions respectively arranged in or on the collar members at or towards their other second ends, wherein the securing member portions are configured to be coaxially connectable to each other to secure the collar members to each other at or towards their other second ends, and the securing member portions are configured to be coaxially disconnectable from each other to permit separation of the second ends of the collar members, wherein a first securing member portion includes one or more radially movable elements, and the first securing member portion is configured to be axially connectable to a second securing member portion through radial movement of the one or more radially movable elements to positively engage the second securing member portion so as to releasably lock the first and second securing member portions together.

2. The securing device according to claim 1 wherein the securing member portions are configured to be coaxially and threadedly connectable to each other to secure the collar members to each other at or towards their other second ends.

3. The securing device according to claim 1 wherein the one or more radially movable elements of the first securing member portion are one or more radially expandable elements, the second securing member portion includes a hollow bore into which the or each radially expandable element is insertable, and the first and second securing member portions are configured to be coaxially connectable to each other through radial expansion of the one or more radially expandable elements to positively engage an inner wall of the hollow bore of the second securing member portion so as to releasably lock the first and second securing member portions together.

4. The securing device according to claim 1 wherein the first securing member portion includes an abutment member that is movable to selectively engage the one or more radially movable elements to force its radial movement; and disengage from the one or more radially movable elements to permit the one or more radially movable elements to return to its original position.

5. The securing device according to claim 4 wherein the abutment member is tapered.

6. The securing device according to claim 4 wherein a or the second securing member portion includes a biasing member that is configured to apply a biasing force to push the abutment member in a direction towards the first securing member portion and away from the second securing member portion.

7. The securing device according to claim 1 including a plurality of attachment assemblies, wherein each attachment assembly is configured to attach a respective one of the securing member portions to the respective collar member.

8. The securing device according to claim 7 wherein each attachment assembly is a trunnion assembly.

9. The securing device according to claim 1 including a support structure, wherein each attachment assembly is arranged to be slidably movable within a respective guide slot of the support structure, and wherein the guide slots are arranged in the support structure so that the attachment assemblies are slidable in the respective guide slots towards each other to connect the securing member portions to each other and so that the attachment assemblies are slidable in the respective guide slots away from each other when the securing member portions are disconnected from each other.

10. The securing device according to claim 9 wherein each guide slot is oriented at a non-zero angle with respect to a horizontal line passing through the support structure.

11. The securing device according to claim 1 including an actuation mechanism operably coupled to the securing member, wherein the actuation mechanism includes a driving assembly configured to, in use, drive the securing member to coaxially disconnect the securing member portions from each other.

12. The securing device according to claim 11 wherein the driving assembly includes a hydraulic or pneumatic actuator configured to, in use, hydraulically or pneumatically drive the securing member to coaxially disconnect the securing member portions from each other.

13. The securing device according to claim 12 wherein the first securing member portion includes an abutment member that is movable to selectively engage the one or more radially movable elements to force its radial movement; and disengage from the one or more radially movable elements to permit the one or more radially movable elements to return to its original position, and wherein the first securing member portion includes a piston and a chamber, the piston is operably coupled to the abutment member, and the piston is housed within the chamber so that a change in hydraulic or pneumatic pressure inside the chamber enables displacement of the piston to move the abutment member to selectively engage the one or more radially movable elements and disengage from the one or more radially movable elements.

14. The securing device according to claim 1 wherein the securing member is configured to permit coaxial reconnection of the securing member portions following disconnection of the securing member portions.

15. The securing device according to claim 1 wherein the collar includes a joint assembly that interconnects the collar members at or towards their first ends, and wherein the joint assembly is configured to apply a pulling force to the first ends of the collar members.

16. The securing device according to claim 15 wherein the joint assembly includes a joint member that is configured to be under tension when the collar members are secured to each other at or towards their other second ends.

17. A fluid conduit assembly comprising first and second objects and the securing device according to claim 1, wherein the first and second objects are first and second fluid conduit sections, wherein the collar is configured to releasably clamp the first and second fluid conduit sections together when the collar members are secured to each other at or towards their other second ends, and wherein the collar is configured to permit separation of the first and second fluid conduit sections from each other when the second ends of the collar members are separated from each other.

18. The fluid conduit assembly according to claim 17 wherein the collar is configured to clamp respective flanges of the first and second fluid conduit sections together when the collar members are secured to each other at or towards their other second ends.

19. The fluid conduit assembly according to claim 17 including at least one shut-off valve located within a hollow bore of at least one of the fluid conduit sections, the or each shut-off valve including a valve member movable between a valve open position and a valve closed position in which the valve member shuts off the flow of a flowable material through the hollow bore, the or each valve member configured to move to its valve closed position on separation of the fluid conduit sections.

* * * * *